(12) United States Patent
Tajnafoi et al.

(10) Patent No.: US 6,343,797 B1
(45) Date of Patent: Feb. 5, 2002

(54) CHUCK WITH AUTOMATICALLY ADJUSTED JAWS AND COMPENSATION OF CENTRIFUGAL FORCE

(76) Inventors: József Tajnafoi, Nagyváradi u. 10., H-3508 Miskolc; József Kertész, Lunkányi J. u. 20.; József Gaál, Reviczki u. 16., both of H-6000 Kecskemét, all of (HU)

(*) Notice: Subject to any disclaimer, the term of this patent is extended or adjusted under 35 U.S.C. 154(b) by 0 days.

(21) Appl. No.: 09/529,166
(22) PCT Filed: Mar. 13, 1998
(86) PCT No.: PCT/HU98/00025
§ 371 Date: Apr. 10, 2000
§ 102(e) Date: Apr. 10, 2000
(87) PCT Pub. No.: WO99/19103
PCT Pub. Date: Apr. 22, 1999

(30) Foreign Application Priority Data

Oct. 10, 1997 (HU) ............................................. P9701629

(51) Int. Cl.[7] ............................................. B23B 31/177
(52) U.S. Cl. ........................ 279/130; 279/121; 279/123
(58) Field of Search ................................ 279/121, 4.12, 279/130, 901, 110, 123; 483/20

(56) References Cited

U.S. PATENT DOCUMENTS

| 2,982,558 A | 5/1961 | Multer |
| 3,610,645 A | 10/1971 | Roddy |
| 3,938,815 A | 2/1976 | F'Geppert |
| 4,700,957 A | * 10/1987 | Kempken et al. ........... 279/121 |
| 4,872,691 A | * 10/1989 | Rohm ........................ 279/123 |

FOREIGN PATENT DOCUMENTS

| DE | 882 790 | 7/1953 |
| DE | 32 19 295 A1 | 12/1983 |
| DE | 34 34 308 | 3/1986 |
| EP | 0 124 697 | 11/1984 |
| GB | 322 991 | 1/1930 |

\* cited by examiner

*Primary Examiner*—Steven C. Bishop
(74) *Attorney, Agent, or Firm*—Venable; Gabor J. Kelemen

(57) ABSTRACT

The invention relates to a chuck with chuck jaws (2) which are guided in the chuck housing (1). Inner jaws (4) which can be coupled or uncoupled are assigned directly or indirectly to said chuck jaws via rack gears (3), whereby the inner jaws (4) are connected to a central pulling head (12) via a wedging mechanism. The pulling head is connected via a rod or hollow shaft (13), said rod or hollow shaft being guided in a central bore of the main spindle (25), to the piston of a hydraulic cylinder arranged on the rear part of the main spindle (25).

15 Claims, 7 Drawing Sheets

CHUCK WITH AUTOMATICALLY ADJUSTED JAWS AND COMPENSATION OF CENTRIFUGAL FORCE

The invention relates to a chuck comprising chuck jaws guided in a chuck body and inner jaws connected to said chuck jaws. The inner jaws can be engaged and disengaged with said chuck jaws directly or indirectly via a rack gear, and are connected through a wedge-type mechanism to a central drawing head which, in turn, is connected to a piston of a hydraulic cylinder assembled on the rearward side of a main spindle via a rod or pipe guided through a central hole of said main spindle.

Several chucks with great gripping force have been developed for serial and mass production. The wedge-type or lever-arm mechanism of such chucks can position the jaws only within a limited range, therefore the jaws should be adjusted or replaced in each case when the diameter of the work piece changes.

A further problem of known chucks relates to compensation of the centrifugal force exerting on the jaws. Gripping force of the jaws tends to steeply descend as rotational speed of the main spindle increases. Because of need for great gripping force it is necessary to keep developing the basic mechanism producing the gripping force.

Recent subtypes of known chuck structures can be classified according to above mentioned problems to be solved.

The most common mode to adjust chuck jaws to different diameters is the manual operation or human action, such as replacement of jaws followed by their orientation with a rack gear and their fixation by bolts.

Manually adjustable connection of jaws is described in DE Patent No. 1 288 872 of the Forkhardt Co. (Werkstatt und Bertieb 106, 173/11-895. oldal).

EP Patent No. 0166 887-A (Forkhardt) and EP Patent No. 0 318 360-A (Gamet Precision) describe a variety of solutions for quick manual replacement and adjustment of jaws.

One of the automated processes for replacing jaws is the robotic jaw replacement. A chuck construction suitable for such replacement is described in EP Patent No. 0 204 095 (S M W Schneider Weisshaupt GmbH). Use of such a chuck, however, requires voluminous and expensive jaw holders and robots.

A method for automatic jaw stepping is described In Hungarian patent applications No. 2737/86, filed on Aug. 29, 1986, and No. 1799/90, filed on Mar. 23, 1990. Inventions described in these documents do not solve the problem of centrifugal force compensation, either. Moreover, these inventions have not published yet.

DE Patent No. 3 726 773 (Röhm) and corresponding EP Patent No. 0 303 002-A also describe means for automatic jaw adjustment. Automatic compensation of the centrifugal force is not even reached by said inventions. Adjusting mechanism of the proposed chuck structure is operated by a hydraulic piston built in the chuck body, wherein introduction of the compressing medium requires special construction of the main spindle.

A chuck structure with compensation of the centrifugal force is described in EP Patent No. 0 349 742-A (Paul Forkhardt). The device comprises front jaws and rear jaws which are connected to each other through a double arm lever requiring a wide hole on the chuck body.

Another chuck structure with centrifugal force compensation is described in EP Patent No. 0 318 360 (Garnet Precision) and preceding FR Patent No. 87 16 243. In these documents no automatic jaw adjustment has been mentioned. Furthermore, in this chuck construction with lever arms there is a linear connection between the lever arms and the chuck jaws, which is disadvantageous with respect to the lifetime of the device.

Inventions relating to basic wedge-type mechanism are described in EP Patent No. 0 215 350-A and EP Patent No. 0 212 198-A (both by Forkhardt), wherein base jaws are positioned via keys accommodated on the side wall thereof, and in EP Patent No. 0 213 815-A (Pratt Burnard International Limited), wherein inclined cylindrical members are built in a hydraulic piston, wherein the cylindrical members are adapted for positioning the base jaws through a stud held by a bracket.

It is an object of the present invention to eliminate disadvantages of known chuck structures and to provide an improved chuck structure capable of automatically changing the diameter range of the chuck jaws and compensating the centrifugal force.

It is still a further object of the present invention to provide a chuck with a wedge-type mechanism capable of tolerating high load and improved switching mechanism for the automatic jaw adjustment, in particular, at solving safety engineering problems.

The aforesaid objects are achieved by the chuck according to the present invention, a basic sub-type of which comprises inner jaws having connector means guided axially and radially, and provided with a rack gear and a double locking device. The inner jaws are built together with counterweights for compensation of the centrifugal force, wherein the inner jaws and said counterweights are formed as a single integrated unit. The inner jaws comprise two heads located on opposite sides of the chuck structure axis, the narrower one of which is in the form of a connector means either provided directly with a rack gear or embedding a connector means provided with a rack gear and guided axially, whereas the wider one of said heads, which forms a counterweight on the opposite side, comprises a hole, the axis of which defines an acute angle with respect to the chuck structure axis. Respective heads of said inner jaws have equal dimensions between each other, wherein bridges between the respective heads are translated axially relatively to each other. The wedge-type mechanism connected to said central drawing head is arranged in such a way the central drawing head comprises three cylindrical studs fixed therein, the axis of which define an acute angle with respect to the chuck structure axis. The studs are connected into holes bored into said counterweights. There are bushings built into holes of the chuck body against respective chuck jaws, wherein the axis of said holes are parallel to the chuck structure axis. A stud segment with an axis in parallel to the chuck structure axis is guided in said bushings, wherein said stud segment and the respective cylindrical stud constitute a single integrated unit, or said stud segment is built together with the cylindrical stud.

Another embodiment of the chuck according to the present invention is the so called "by-passing" chuck. In this embodiment, the inner jaws comprise connector means guided axially and radially and provided with a rack gear and a double locking device. Each connector means has two cylindrical surfaces with a common axis but different diameter, wherein the larger cylindrical surface is guided in a hole comprising a wide control element, wherein said hole is bored into the face of said inner jaw, whereas the smaller cylindrical surface is guided in a hole bored into the narrower, rearward side of said inner jaw, and said counterweights for compensation of the centrifugal force are connected, through arms, to grooves formed on the side wall of said inner jaws. The longitudinal axis of said arms extend in parallel to the axis of rotation of the main spindle.

According to a preferred embodiment of the present invention, a first element of the double locking device of the chuck is a control ring guided turnably on the external surface of the chuck body Control elements in the form of control rollers and control members are secured to the control ring. A second element of the double locking device is a locking unit arranged between the control ring and the chuck body.

According to the above-mentioned embodiment of the present invention, the locking unit between the control ring and the chuck body is preferably formed as a locking pin guided axially in the control ring. When the control ring and the chuck body are locked, back side of the locking pin accommodates between locking surfaces arranged rigidly on the machine tool body. Preferably, the control ring of the chuck has a hole on its lateral surface into which a stud of a manually operated chuck wedge can be inserted. The chuck wedge has another stud connected to a surface which is adapted for axial moving the locking pin.

Preferably, the control ring of the chuck has supporting segments extending radially into cutoffs of the chuck. The supporting segments, which can be turned, are inserted between the internal face of the cutoffs of the chuck body and the face of an adapter disk. Control rollers, control wedges or supporting locks extending between the adapter disk and the connector means guided axially are secured to the supporting segments.

According to another embodiment of the invention, the first element of the double locking device of the chuck comprises control surfaces and control members to control the locking process. The control surfaces and the control members are formed on a control ring, which can be turned relatively to the chuck body, and connected to the connector means guided axially either directly or indirectly through interface elements. The second element of the double locking device is an actuating mechanical structure assembled onto the rear surface of the main spindle and comprising a rotating star connected to the control ring via a pipe inserted into the hole of the main spindle. Shanks of the star are led out through an aperture of the inset element arranged between the main spindle and the main hydraulic cylinder. The end of the shanks are provided with rollers which are connected to guide-way sections of a ring, wherein axis of the guide-way sections is parallel to the chuck structure axis. Said guide-ways are followed by helical guide-way sections at one of their ends. The inset element is provided with additional rollers connected to the guide-ways of the ring in parallel to the chuck structure axis. Moreover, a straddle fork is inserted into the groove of the ring, wherein the groove is perpendicular to the chuck structure axis. The straddle fork is also in connection with the piston of an auxiliary hydraulic cylinder.

According to a preferred embodiment of the present invention, a single central drawing pipe is built in the hole of the main spindle. The external surface of the central drawing pipe, on both front and back side thereof, contains surface regions, such as polygonal surfaces, adapted for transmission of torque. Said surface regions face partially to surface regions of the control ring guided in the chuck body, and partially to surface regions of the rotating star also adapted for transmission of torque. Moreover, the external surface of the central drawing pipe, on both front and back side thereof, include flanges fixed turnably to the central drawing head including a wedge, and to the piston-rod of the rearward main hydraulic cylinder.

Preferably, the second element of the double locking device is an arm connected via a hinge to the rotating star arranged on the rear end of the main spindle, wherein the rotating star is prevented from turning relatively to the central drawing pipe. Surface regions of the arm are engaged with the main spindle in a first switched state, whereas the surface regions are engaged with static (i.e. non-moving) grooves/faces in a second switched state. Surface regions extending from the face surface of the control ring of the chuck, such as surface regions of the detent pin, are preferably led into cutoffs of the central drawing head at normal operation. During the procedure of jaw adjustment, i.e. at both turned states of the control ring, however, the above-mentioned surface regions butt on the face of the central drawing head.

According to the present invention, automatic jaw adjustment can be simultaneously performed for all of the three jaws by step driving. Both moving components of this kind of step driving—i.e. radial motion of the inner jaws and engagement/disengagement of the inner jaws and the chuck jaws—can be fully or partially effected by driving capabilities of the machine tool, which requires, however, special safety for chucks rotating at high speed. Such an operational safety can be achieved by the utilization of the double locking device of the chuck according to the present invention. According to an aspect of the present invention, compensation of the centrifugal force exerting on the chuck jaws can be performed by arranging the inner jaws so that a part of the inner jaws of greater counterweight extend to the opposite side of the chuck. The cylindrical wedges accommodated in the griping structure are also arranged on the opposite side of the chuck, against the chuck jaws The by-passing type of chucks are provided with two cylindrical studs each having a different diameter.

The invention will be better understood with reference to the accompanying figures, wherein FIG. 7*a* is the enlarged view of the upper-left segment of FIG. 7, FIG. 13*a* is the enlarged sectional view of the locking device in FIG. 13.

As shown in FIGS. 1–4 by way of example, an automnatic chuck according to the invention is provided with jaws 2 guided in a chuck body 1. The chuck jaws 2 are connected through a rack gear 3 to toothed head 4' of the inner jaws 4. The inner jaws 4 are guided radially in a ring 5 which can axially move in the chuck body 1. The entire diameter of the ring 5 is used for the radial guide in such a way that guiding elements are formed on the opposite sides of the ring 5. Each inner jaw 4 has two heads located on the opposite sides of the inner jaws 4 with respect to the chuck structure axis. The wide head 6 arranged against the head 4', which is provided with a narrow and lightening bore, constitutes the counterweight for compensation of the centrifugal force. Heads 4', 6 of the three inner jaws 4 have the same dimensions, while bridges 7, 8, 9 connecting the heads 4' and 6 to each other in the three inner jaw 4, respectively, are axially translated relatively to each other. Thus the inner jaws 4 unify the counterweights and the respective toothed heads into a single, integrated body. Due to dimensions of the counterweights, centrifugal forces exerting on the head 4' of the inner jaws 4 are compensated, as well as a substatioal portion of the centrifugal forces exerting on the chuck jaws 2. The wide head 6 of the inner jaws 4 is provided with cylindrical holes 10 defining an acute angle with respect to the chuck structure axis and capable of receiving cylindrical studs 11. According to the holes 10, each of the three studs 11 has an angled axis with respect to the chuck axis. The studs 11 are fixed in a central drawing head by an angular spacing of 120°. The central drawing head is actuated convenitionally through a tube or pipe 13 built in the hole of the main spindle. The end of the studs 11 adjacent to the face of the chuck is guided in a bushing 14 fixed in a hole of the chuck body 1, wherein the studs 11 are arranged immediately against the chuck jaws 2. For this purpose, each stud 11 has a cylindrical surface region having an axis parallel to the chuck structure axis. The studs 11 with the aforementioned elements connected thereto constitute a special wedge-type mechanism which assign the axial motion of the central drawing head 12 to a common radial motion of the inner jaws 4. The central drawing head 12 is guided in a ring 16 secured to the chuck body 1. A control ring 18 is also guided on the surface 17 of ring 16. Control surface 19 of the control ring 18 is connected to the face of a stud 20 guided in the ring 16. The rear face of the stud 20 is supported by the rearward surface of the ring 5. A guiding surface 21 of the control ring 18 shown in FIG. 3 contacts the guiding surface of a stud 22 fixed to the ring 5. The control ring 18 has two operating positions. In the first position, the ring 5 is pushed forward by the guiding surface 19 via a stud 20 so that chuck jaws 2 are connected to the rack gear 3 of the inner jaws 4. In the second, turned position of the control ring 18, the ring 5 is pulled backward by the guiding surface 21 of the ring 18 via the guiding surface of the stud 22 so that chuck jaws 2 and the rack gear 3 of the inner jaws 4 become disengaged. Adjustment of the diameter of the chuck jaws 2 guided in the chuck body 1 to another range of diameter is performed by simultaneously stepping all of the three chuck jaws 2. Diameter of the chuck jaws 2 can be set by the stepping process to both greater and smaller values. Both kinds of stepping is performed by combining two independent motions which are the following: axial motion of the central drawing head 12, and axial motion of the ring 5 which is effected by rotating the control ring 18 as described before.

Figures 1, 3:
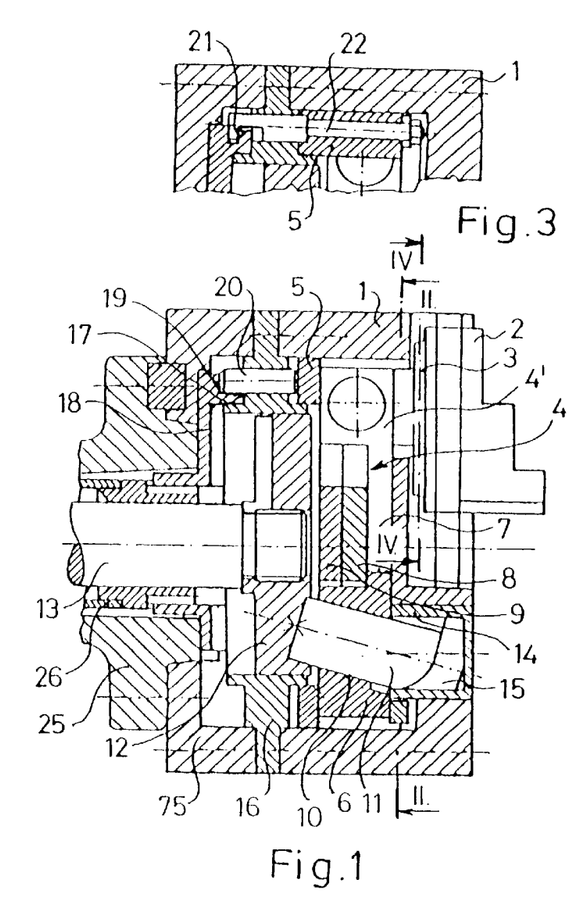
FIG. 1 is a sectional view of the chuck according to the invention.
FIG. 3 is a fragmentary sectional view taken on line III—III in FIG. 2.
Figure 2:
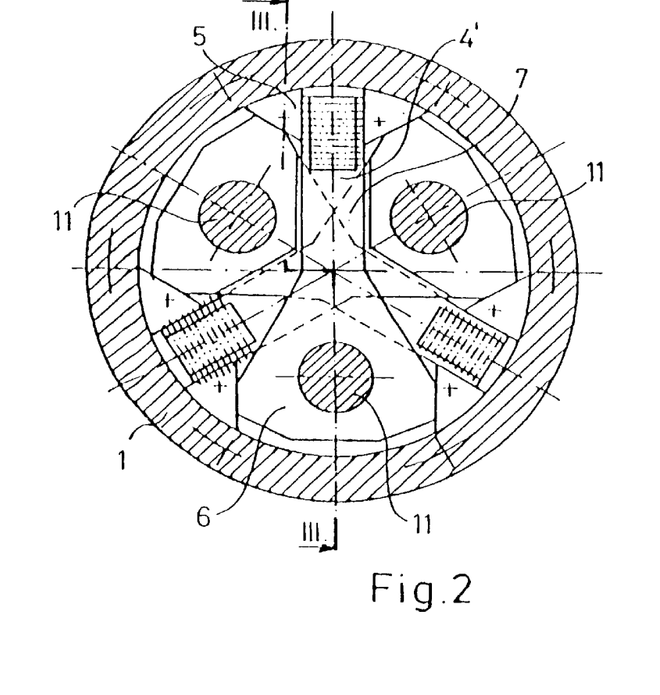
FIG. 2 is a sectional view taken on line II—II in FIG. 1.
Figure 4:
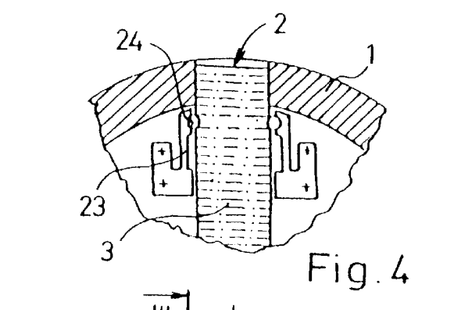
FIG. 4 is a fragmentary sectional view taken on line IV—IV in FIG. 1.

Setting the diameter of the chuck jaws 2 to smaller values may comprise the following steps:

1. The central drawing head 12 moves backward so that the diameter of the circle, along which the toothed heads 4' of the inner jaws 4 are held, decreases.
2. The ring 5 moves backward so that the rack gear 3 between the chuck jaws 2 and the inner jaws 4 becomes disengaged.
3. The central drawing head 12 moves forward so that the diameter of the circle, along which the toothed heads 4' of the three inner jaws 4 are held, increases.
4. The ring 5 moves forward so that the rack gear 3 between the chuck jaws 2 and the inner jaws 4 becomes engaged again.

The above-mentioned cycle of setting process can be repeated so many times as needed. In order to maintain correct operation, chuck jaws 2 are not allowed to move when the rack gear 3 is disengaged. This can be achieved by the use of leaf-spring type orientation means 23, shown in FIG. 4, which are fixed to the internal surface of the front wall of the chuck body 1. The orientation means 23 is supported on two sides by balls 24 adhered or soldered to the leaf-spring and adapted for direct orientation of the rack gear 3 of the chuck jaws 2. Another condition for the correct stepping process is that in Step 3., the inner jaws 4 move outward to a greater diameter by a translation of only one tooth. This is achieved by the limitation of the stroke of the piston actuating the central drawing head 12. This limitation can be performed by the solution applied in programmed bumper-type control wherein the bumper adapted to stop the motion may be either a mechanic sensor, an inductive sensor or the like.

Outward stepping of the chuck jaws 2 can be performed by a distinct sequence of the aforementioned steps. The modified sequence is the following: Step 2, Step 1, Step 4 and Step 3.

Figure 5:
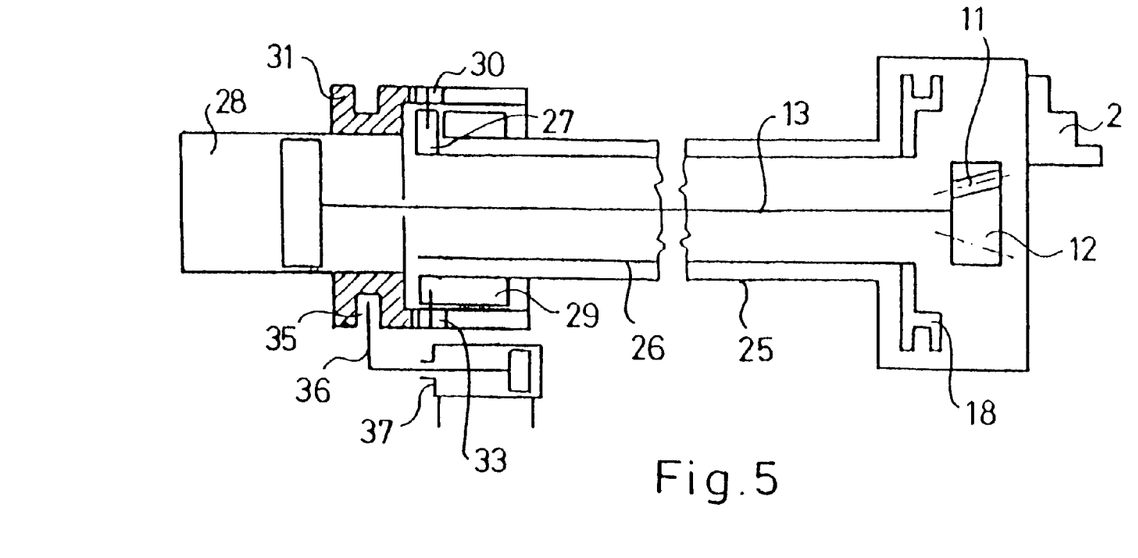
FIG. 5 is a schematic, sectional view of the rearward operating structure of the chuck according to the invention, wherein the section is taken in longitudinal direction.
Figure 6:
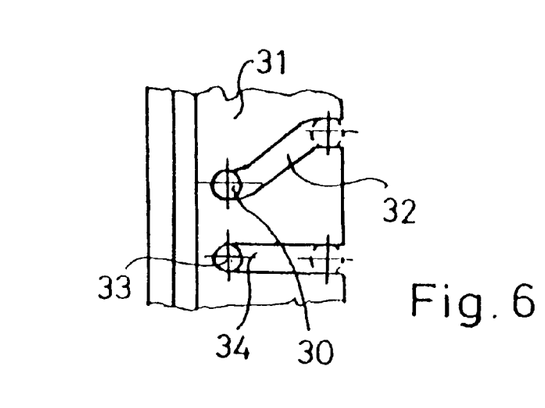
FIG. 6 is a fragmentary extended view of the lateral surface of the ring in FIG. 5.

FIGS. 5. and 6. show an embodiment of the rotating mechanism of the control ring 18. The control ring 18 is connected to a rotating star 27 located on the rearward side of the main spindle 25 through a pipe 26, which is led through a hole of the main spindle 25. Shanks of the rotating star 27 can turn in substantial radial grooves of an inset 29 accommodated between the main spindle 25 and the main hydraulic cylinder 28. The end of thee shanks of the rotating star 27 are provided with rollers 30 which are guided in guide-ways 32 of a ring 31 actuated along the external surface of the inset 29 and main hydraulic cylinder 28. The rollers 33 fixed in the inset 29 are guided in guide-ways 34 of the ring 31 in parallel to the chuck structure axis. Furthermore, an outer groove 35 of the ring 31 is connected to an auxiliary hydraulic cylinder 37 through a straddle fork 36. When moving to the left, the piston of the auxiliary hydraulic cylinder 37 pushes away the ring 31 so that guide-ways 32 and 34—through rollers 30 and 33—force both the rotating star 27 and—through the pipe 26—the control ring 18 to turn relatively to the main spindle 25.

FIGS. 7, 7a, 8 and 9 show an alternative embodiment of the chuck according to present invention. For the reason manufacturing, members carrying the inner jaws 38 and guided axially in the chuck body 1 consist of two pieces 39 and 40 bolted one to the other, wherein cylindrical control element 39' of the piece 39 is inserted in an axially movable manner into the axial hole of the chuck body 1. The piece 40 fixed to the control element 39' has a radial control element 40' having a length extended up to the outer diameter of the chuck body 1. The control element 40' is connected to the radial control element 38' of the inner jaw 38. This arrangement allows the length of the radial control elements of the inner jaws 38 of the chuck provided with by-pass holes to be increased to a maximum value.

Figure 7:
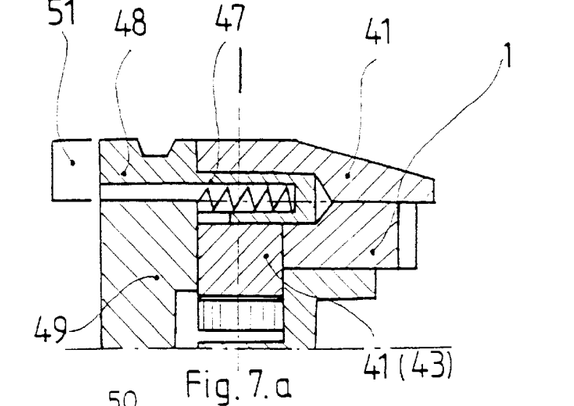
FIG. 7 is a sectional view of an exemplary embodiment of the chuck according to the invention taken in longitudinal direction.
Figure 8:
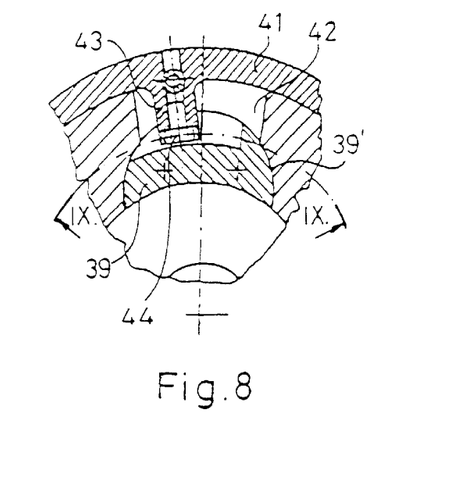
FIG. 8 is a sectional view taken on line VIII—VIII in FIG. 7.
Figure 9:
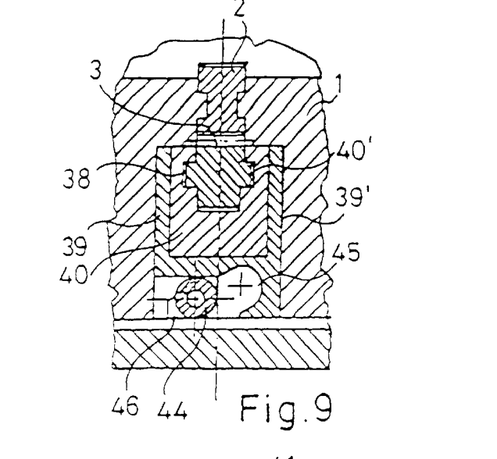
FIG. 9 is a sectional view taken on line IX—IX in FIG. 8.

In FIGS. 7 and 8, a control ring 41 plays the roll of the control means. Between the internal faces of cutoffs 42 of the chuck body 1 and the faces of an adapter disk 49, a plurality of segments 43 is guided, wherein segments 43 constitute a single unit together with the control ring 41, and extend radially into cutoffs 42 of the chuck body 1. The segments 43 are used for securing control rollers 44 connected to a guide-way 45 of the piece 39. The inner part of segment 43 is formed so that the piece 39 is supported by both the control rollers 44 and the planar surfaces thereof at normal operation, i.e. when the chuck is rotating at high speed.

During normal operation, the control ring 41 is locked to the chuck body 1 via a cylindrical locking stud 47. The locking stud 47 has a part 48 with greater diameter which is machined in such a way that the part 48 can slide along the adapter disk 49 on a circular path corresponding to the outer diameter thereof.

In order to move the chuck jaws 2 in the stepping process, rack gear 3 of the inner jaws 38 and the chuck jaws 2 are disengaged in the following way. In a selected initial position of the chuck, the locking stud 47 is pushed to the left in a groove 50 of the adapter disk 49. This unlocks the locking stud 47 between the chuck body 1 and the control ring 41, in particular the segment 43 thereof. At the same time, locking occurs between the piece 48 and a stable groove 51 fixed to the enclosure of the main spindle 25. By rotating the main spindle 25 in this position, i.e. by C-shaft rotating which is a controlled driving of slow rotation, the entire chuck, with the axially backward movable pieces and the guide-ways 45 thereon, will rotate, while the control ring 41 together with the control roller 44 will be blocked. Motion of the guide-way 45 relatively to the control roller 44 causes the pieces 39 and 40 to be pulled backward together with the inner jaw 38 therefore the rack gears 3 become disengaged. Engagement can be performed by inverse rotation. At turn benches having a C-shaft, the rotating mechanism, which rotates the rearward control ring 41 through the main spindle 25, may be omitted in case of application of the above-mentioned locking devices.

Figures 10, 12:
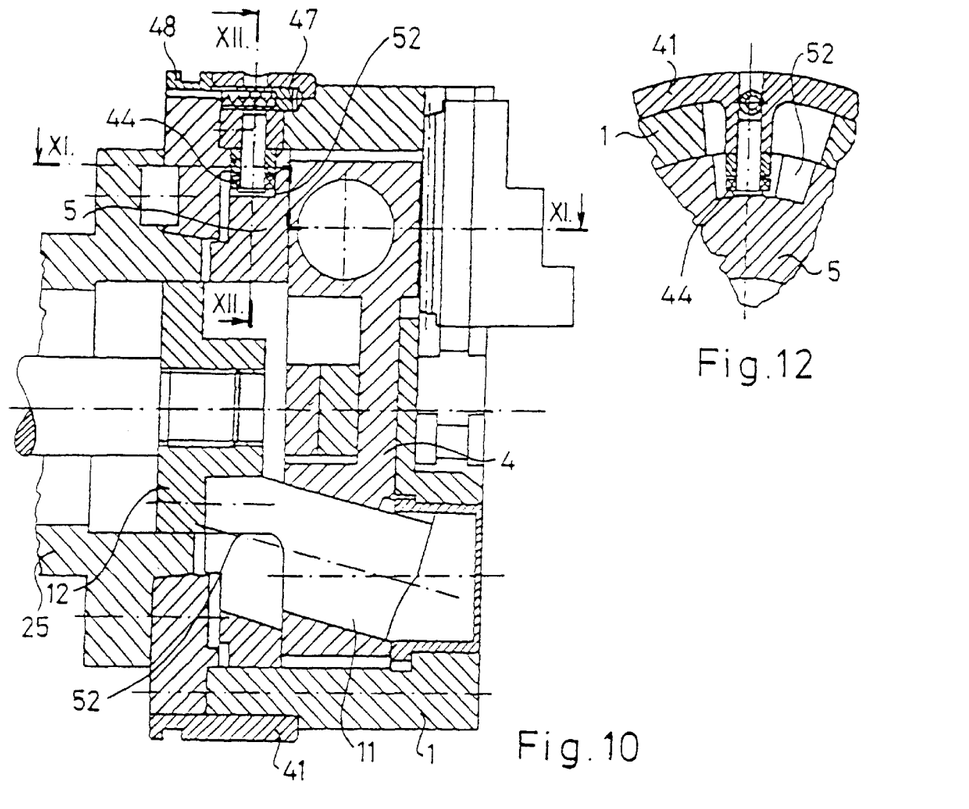
FIG. 10 is a sectional view of a further exemplary embodiment of the chuck according to the invention taken in longitudinal direction.
FIG. 12 is a schematic, fragmentary sectional view taken on line XII—XII in FIG. 10.
Figure 11:
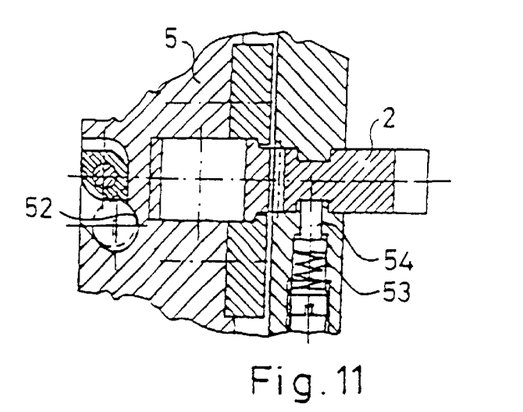
FIG. 11 is a sectional view taken on line XI—XI in FIG. 10.

FIGS. 10, 11 and 12 show a further alternative embodiment of the chuck according to the present invention. The structure of the inner jaws are the same as that of the inner jaws 4 in FIGS. 1 and 2. The central drawing head 12 is guided in a hole of the main spindle 25. Cylindncal studs 11, as parts of the wedge-type mechanism, are secured to the central drawing head 12 by bolts arranged axially.

The control ring 41 and the locking stud 47 inserted therein are arranged in the same way as illustrated in FIGS. 7 and 7a. The control rollers 44 are guided in guide-ways 52 of the ring 5 carrying the inner jaws 4, as best shown in FIGS. 11 and 12. When the rack gears 3 are disengaged, the chuck jaws 2 are held in place by the friction of a stud 54 pushed by a spring 53, as illustrated in FIG. 11.

Figures 13, 14, 15:
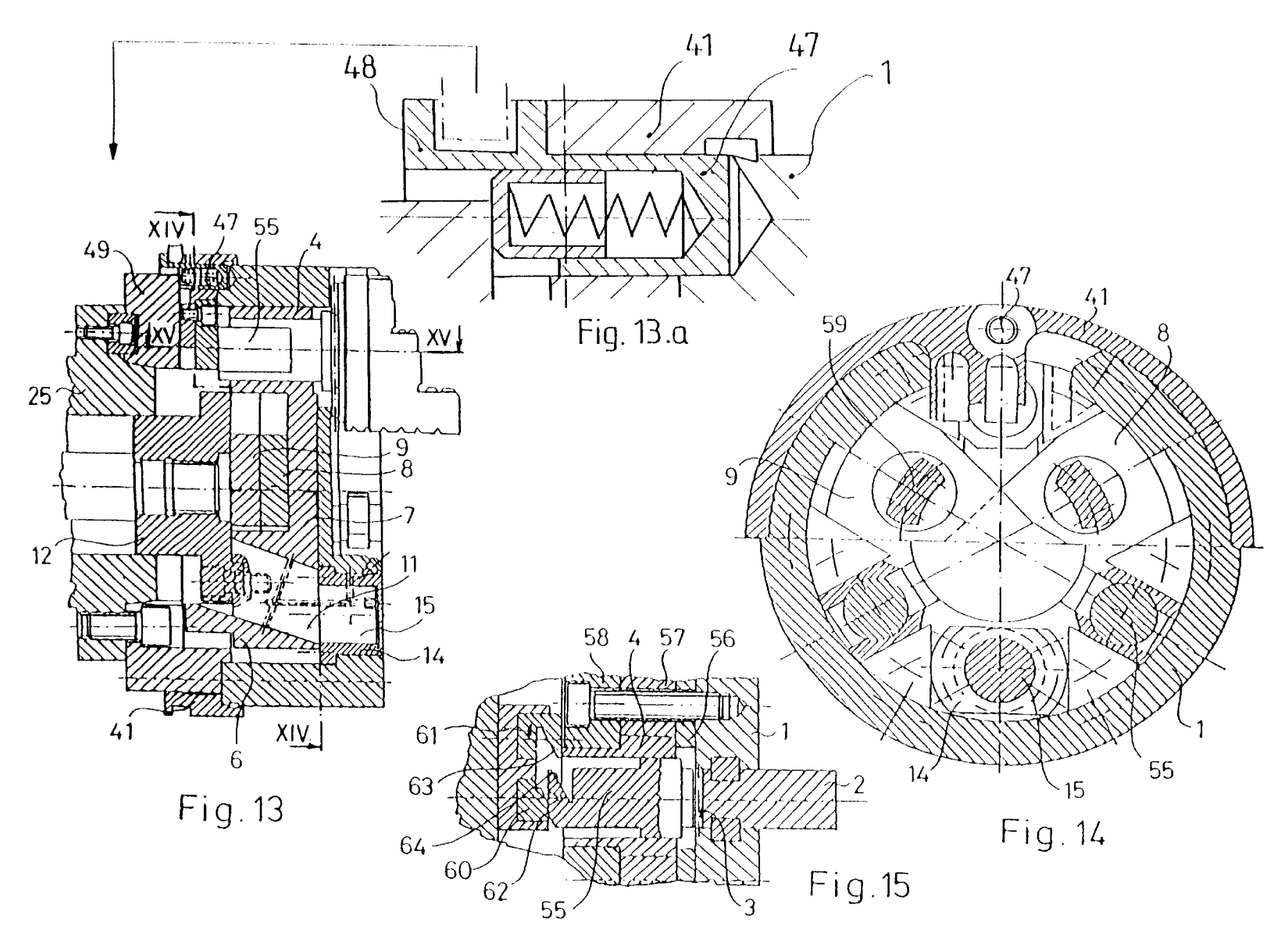
FIG. 13 is a sectional view of a further exemplary embodiment of the chuck according to the invention taken in longitudinal direction.
FIG. 14 is a sectional view taken on line XIV—XIV in FIG. 13.
FIG. 15 is a fragmentary sectional view taken on line XV—XV in FIG. 13.

FIGS. 13, 14 and 15 show still a further embodiment of the chuck according to the present invention. Rack gear 3 of each chuck jaw 2 is engaged with the rack gear of a connector means 55 having cylindrical surface and inserted into an axial hole of the respective inner jaw 4. The inner jaws 4 are radially guided by control elements 56, 57 and 58 which are secured by bolting to the internal face of the chuck body 1. As shown in FIG. 15, locking mechanism of the control ring 41, including the locking stud 47, and its operation are the same as described before and illustrated with respect to FIGS. 7 and 7a.

The cylindrical studs 11 are connected to the central drawing head 12 by round segments. Wedge surfaces and supporting surfaces on the rearward side of the connector means 55 contact hardened control members 60 and 61 fixed in the control ring 41. At the forward pushed position of the connector means 55, the control member 60 interfaces a rearward surface 62 of the connector means 55. During rotating the control ring 41, a wedge surface 63 of the control member 61 contacts a conical wedge surface 64 of the connector means 55, which causes the connector means 55 to be pulled backward.

FIGS. 16 to 20 show a further embodiment of the chuck according to the present invention. This embodiment is referred to as a by-pass type chuck in which a wedge-type central drawing head 65 is connected through a wedge-type mechanism 66 to the inner jaws 67. Front part 68 of the inner jaws 67 are guided radially in the chuck body 1 via wide control elements. Rear part 69 of the inner jaws 67 is, however, narrower and its top part is formed to substantial semi-cylindrical. Each inner jaw 67 has two holes having a common axis and different diameters in which connector means 70 are guided. The connector means 70 are connected to the chuck jaws 2 through a rack gear 3 formed on the face of the connector means 70. Rearward surface of the connector means 70 is supported by a planar front surface 72 of a hardened control member 71 fixed in the control ring 41. After the control ring 41 has turned, wedge surface 73 of the control member 71 contacts a conical wedge surface of the connector means 70 and it pulls the connector means 70 backward.

Relative turn of the control ring 41 with respect to the chuck body 1, which causes the rack gear 3 to get engaged and disengaged, can be performed by both automatically and manually. The. automatic operation is similar to the operation described before with respect to FIGS. 7 and 7a. The locking stud 47 is pulled backward by a trip secured to the piston of a small hydraulic servo-cylinder into a non-moving groove 51 on the machine tool. This prevents the control ring 41 from turning and, at the same time, causes the chuck body 1 and the control ring 41 to be disengaged. The chuck body 1 can be relatively turned by slow turning of the main spindle 25 through corresponding means, such as C-shaft driving, available in the machine tool.

Figures 16, 17, 19:
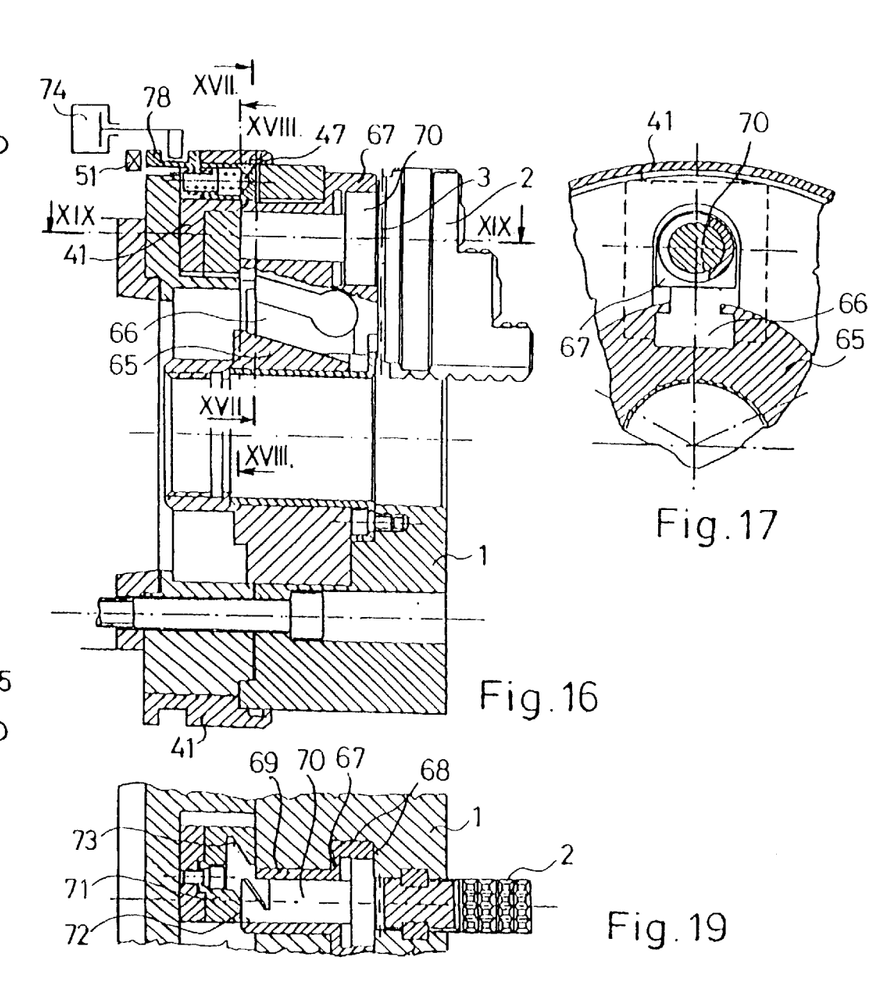
FIG. 16 is a sectional view of a further exemplary embodiment of the chuck according to the invention taken in longitudinal direction.
FIG. 17 is a sectional view taken on line XVII—XVII in FIG. 16.
FIG. 19 is a fragmentary sectional view taken on line XIX—XIX in FIG. 16.

The chuck is provided with three locking studs 47, only one of which is used for making a lock between the chuck body 1 and the control ring 41, whereas the remaining two locking studs 47 are smaller and can not be pulled backward. Thus a single hydraulic servo-cylinder 74 of small dimensions, shown in FIG. 16, is sufficient for automatic jaw stepping.

In fully automatic manufacturing cells it may be necessary to automatically replace a chuck jaw. Very few replacement jaws may be needed because the change in the diameter range is managed by automatic jaw adjustment, although, in certain cases, soft jaws may be needed, for example. In such cases, all of the three locking studs 47 are configured in the same way in the chuck body 1, which necessitates three hydraulic servo-cylinders 74 of small dimensions. A great advantage of the chuck according to the present invention over the former solutions is that a chuck jaw storage with substantially lower capacity is required for the maintenance.

Figures 18, 20:
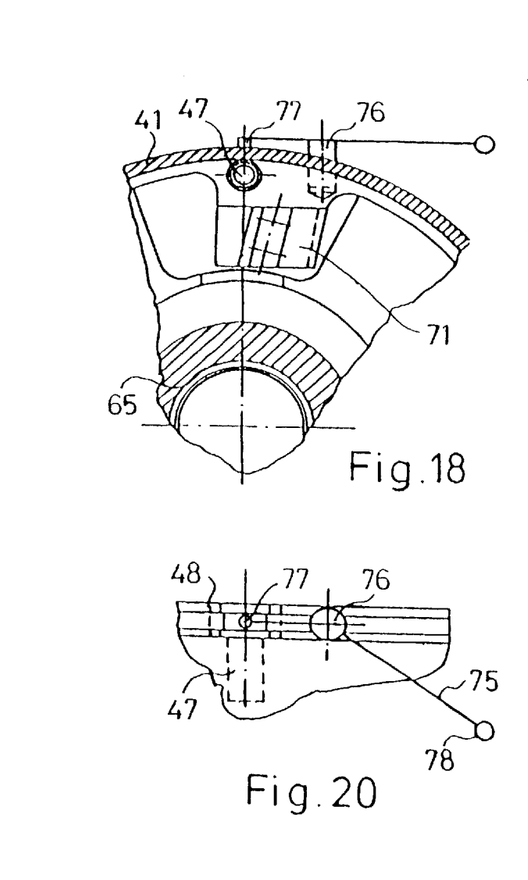
FIG. 18 is a fragmentary sectional view taken on line XVIII—XVIII in FIG. 16.
FIG. 20 is a fragmentary top view of chuck in FIG. 18.

FIGS. 18 and 20 show a device adapted for quick and manual replacement of jaws.

With respect to the embodiment shown in FIG. 18, two studs 76 and 77 are secured to a chuck wedge 75, wherein axis of the studs 76 and 77 are parallel. Stud 76 can be inserted into a hole of the control ring 41. This hole is preferably located on the thicker section of the control ring 41. The stud 77 is extend into an outer groove of the locking stud 47. Manually draw of the manual grip 78 of the chuck wedge 75 causes the chuck wedge 75 to turn around the stud 76 and then pull out the locking stud 47. Pulling out of the locking stud 47 is limited, and after the locking stud 47 has butted on, the drawing force exerting on the manual grip 78 turns the control ring 41. The connector means can be thus pulled backward by a single movement and all the three jaws can be quickly replaced manually. In this case, it is not needed to orient the main spindle 25. If the hydraulic servo-cylinders is built in on the bottom or aside, the entire top part of the chuck remains free for manual operation. In order to maintain operational safety and to avoid accident, side walls of the groove 51 are configured so that the locking stud 47, which is pulled out, butts thereon, thus preventing the main spindle 25 from starting at the disengaged state of the rack gear 3, even in case of manual operation.

The operational modes and chuck structures described above can be applied at chucks provided with control rings and a locking stud, i.e. at the chucks illustrated in FIGS. 7 to 20.

The aforementioned chucks can be grouped into a chuck family of which members are suitable for manual and quick replacement of the jaws;
automatic jaw stepping; and
both automatic jaw stepping and automatic replacement of the jaws.
This chuck family has members which are
compensated with respect to the centrifugal force, and
configured to have by-pass structure.

Figures 21, 24, 25:
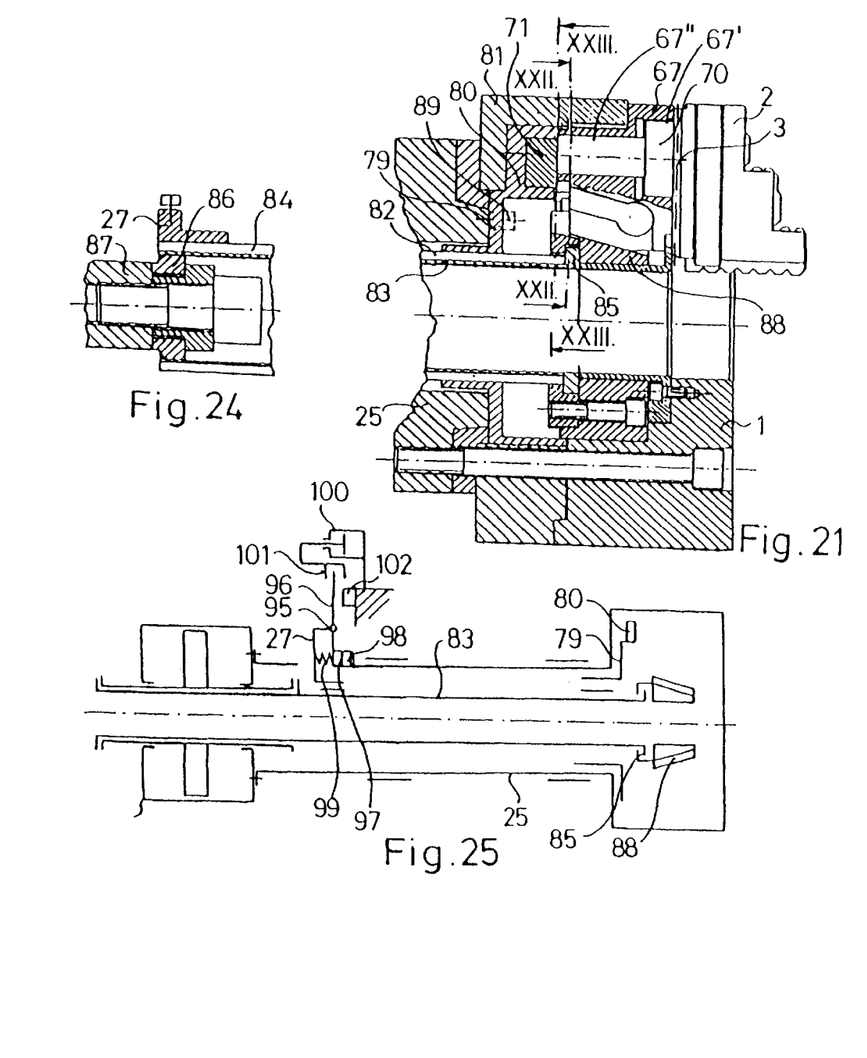
FIG. 21 is a sectional view of a further exemplary embodiment of the chuck according to the invention taken in longitudinal direction,.
FIG. 24 is a fragmentary sectional view of the drawing/rotating pipe an the rearward side of the main spindle taken in longitudinal direction.
FIG. 25 is a schematic, fragmentary sectional view of another exemplary embodiment of the drawing/rotating pipe on the rearward side of the main spindle taken in longitudinal direction.
Figure 22:
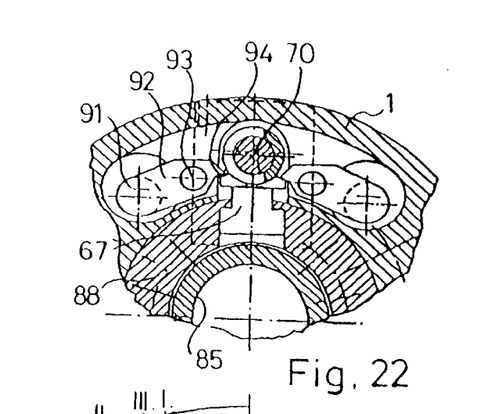
FIG. 22 is a fragmentary sectional view taken on line XXII—XXII in FIG. 21.

FIGS. 21 to 25 show another alternative embodiment of the chuck according to the present invention. Jaws 2, rack gear 3, inner jaw 67 and connector means 70 are the same elements as illustrated in FIGS. 16 to 18. Moreover, FIG. 18 is, in fact, a combined view the chucks shown in FIGS. 16 and 21. According to FIGS. 21 to 25. the control members 71 are not secured to the outer control ring, but to segments 80 of an inner ring 79, wherein segments 80 extend into milled caves on the rearward side 81 of the chuck body 1. The control ring 79 is connected, through surface regions 82, e.g. polygonal surfaces, to surface regions adapted for transmission of torque and formed on the external surface of a central drawing pipe 83. The rearward surface of the central drawing pipe 83 shown in FIG. 24 is also provided with a surface region adapted for transmission of torque which interfaces another torque-transmitting surface region formed on the internal surface of the rotating star 27 illustrated in FIG. 5. According to one aspect of the present invention, rotating mechanism of the rotating star 27 is the same as described before with respect to FIGS. 5 and 6. However, the chuck in FIGS. 21 to 25 comprises no additional rotating pipe and internal drawing pipe because the central drawing pipe 83 completes both functions of:

rotating control ring 79 via surface regions 84 formed on the central drawing pipe 83 and adapted for transmission of torque; and engaging the piston-rod of the rearward main hydraulic cylinder 87 and the central drawing head 88 via flanges 85 and 86 formed on the front and rear side of the central drawing head 83, respectively, and connected to both the central drawing head 88 and the piston-rod 87 in a turnable manner.

Figure 23:
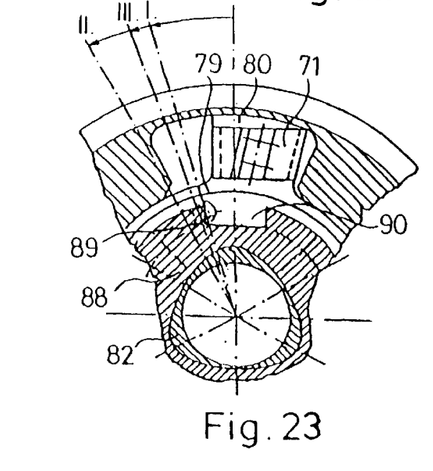
FIG. 23 is a fragmentary sectional view taken on line XXIII—XXIII in FIG. 21.

Due to the fact that a single pipe is to be led through the inside hole of the main spindle 25, the by-pass inside the chuck according to the invention may have the same dimensions as that of known chucks manufactured with the possibly largest by-pass. A more advantageous embodiment of the automatic chucks according to the invention is provided with additional detent pins 89 fixed in the control ring 79. At normal operation, i.e. at gripping the work piece, the detent pins 89 are inactive because they run into cutoffs of a disk 90 secured to the central drawing head 88 when the central drawing head 88 is being pulled backward. Thus the central drawing head 88 can move backward into its position shown in FIG. 23 with a maximum stroke. However, if the control ring 79 is caused to turn a little at the front position of the central drawing head 88, face of the central drawing head 88 butts on the front surface of the detent pins 89 when the central drawing head is pulled backward, and thus the central drawing head 88 can move with shorter stroke. This shortened movement corresponds to the radial movement of the inner jaw 67 stepped by one tooth. Such movements needed to step the inner jaws 67 require no rearward positioning switches. Instead, precise positioning can be achieved by fixed internal bumpers. Preferably, three turning positions of the control ring 79 are defined as best shown in FIG. 23:

Position 1: Control member 71 supports the connector means 70 by a large surface, while the detent pin 89 allows the central drawing head 88 to run backward to a maximum distance.

Position 2: The control member 71 pulls backward the connector means 70, while the detent pin 89 allows the central drawing head 88 to run backward in a limited extent so that it translates the inner jaw 67 by one tooth in radial direction.

Position 3: It is an intermediate position between Position 1 and 2. In one hand, the control member 71 still supports the connector means 70 by a small surface region while, on the other hand, the detent pin 89 already limits motion of the central drawing head 88 in such a way that the inner jaw 67 is allowed to move by only one tooth.

Position 1 is used at normal operation of the chuck, i.e. at gripping the work piece. At automatic jaw adjustment, the control ring 79 firstly moves into Position 2 when it is stepped inward, and into Position 3 when it is stepped outward. During this process, angular position of the control ring 79 varies between that of Position 2 and 3, therefore the inner jaw 67 can 'step only one tooth in both cases of being stepped inward and outward.

In an alternative embodiment of the chuck according to the invention, the precise positioning with respect to the bumpers is achieved by assigning exactly two tooth pitches to the maximum stroke of the central drawing head. In most cases, the central drawing head is actuated up to its boundary position. If gripping occurred in this boundary position—probably very rarely—, it may be sufficient to use only one tooth pitch, in which case the central drawing head located rearward can be stopped in its intermediate position by a positioning switch.

Another alternative embodiment of the chuck according to the invention can be seen in FIG. 25. Face of the chuck is similar to that of the chuck shown in FIG. 21, therefore it is only schematically illustrated in FIG. 25. The control ring 80 is rotated by a central drawing pipe 83 accommodated in a hole of the main spindle 25. The rotating star 27 is connected to an arm 96 through a hinge 95. Claws 97 on the arm 97 are connected to claws 98 on the main spindle 25. At normal operation, this connection is made stable by a spring 99 which flocks the control ring thus preventing it in a safe manner from turning relatively to the main spindle 25. At automatic jaw adjustment, relative turn of the control ring 80 with respect to the main spindle 25 is performed by rotating the main spindle 25. In this case, an auxiliary hydraulic cylinder 100 pulls the arm 96 backward through jaws 101 while the arm 96 is connected to a non-moving groove 102. During this process, claws 97 and 98 become disengaged In this embodiment, the arm 96 plays the role of the locking stud 47 described before and constitutes a safe double locking device on the rearward side of the main spindle 25.

According to the invention, it is advantageous that setting of the diameter range is preformed without human intervention that is by automatic jaw adjustment. A further advantage of the chuck according to the present invention that, in addition to the automatic jaw adjustment, it is possible to quickly adjust the jaws manually as well as replace the jaws both automatically and manually. Thus chucks according the present invention constitute a chuck family applicable at any level of automation including simple lathes, complex lathe systems as well as automatic production cells.

It is another advantage of the chuck according to the invention that, due to its special structure, the centrifugal force exerting on the chuck jaws are partially or fully compensated.

It is a further advantage of the chuck according to the invention that the counterweights compensating the centrifugal force and the inner jaws constitute a single integrated body, and the counterweights act directly on the inner jaws without lever arms or connections. In the letter case it is advantageous that long inner control elements can be applied within the chuck.

A preferred embodiment of the chuck according to the present invention is capable of compensating the centrifugal force. At this embodiment, the counterweights compensating the centrifugal force act to the grooves formed on the side wall of the inner jaws through lever arms of which axis is parallel to the chuck structure axis.

Referring to FIGS. 1 to 6 and FIGS. 21 to 24, some of the chucks according to the present invention has the advantage that the they can operate at any position of the main spindle, i.e. the main spindle should not be precisely positioned.

It is still a further advantage of the chuck according to the invention that means, which already exist in the machine tool, are utilized for the automatic jaw adjustment, including C-shaft driving of the main spindle for turning the control ring, as illustrated in FIGS. 7–18, as well as utilization of the actuating means of the central drawing head for stepped moving of the inner jaws.

A further advantage of the chuck according to the invention that it comprises multifunctional elements, such as the locking stud 47 performing a dual function: during normal operation of the chuck it safely prevents the control ring from turning, whereas during jaw adjustment it locks the main spindle against starting. Another element with dual function is the central drawing pipe 83, for example, which transmits both the pulling force to the central drawing head and, through torque-transmitting surface regions, the torque to rotate the rotating star. Thus, by omitting the pipe, throughput of the main spindle will not be lower than that of the known chucks.

It is still a further advantage of the chuck according to the invention that, in most cases, rack toothing is configured in such a way that jaws move precisely up to rigid bumpers thus increasing the operational safety of the chuck in a great extent.

What is claimed is:

1. A chuck comprising:

chuck jaws 2 guided in a chuck body 1;

inner jaws 4, 38 connected to said chuck jaws 2, wherein the inner jaws 4, 38 can be engaged and disengaged with said chuck jaws 2 directly or indirectly via a rack gear 3, and are connected through a wedge-type mechanism to a central drawing head 12 which, in turn, is connected to a piston of a hydraulic cylinder 28 assembled on the rearward side of a main spindle 25 via a rod or pipe 13 guided through a central hole of said main spindle 25; wherein said inner jaws 4, 38 comprise connector means 4', 55 guided axially and radially, and provided with a rack gear 3 and a double locking device;

said inner jaws 4, 38 are built together with counterweights 6 for compensation of the centrifugal force, wherein the inner jaws 4, 38 and said counterweights are formed as a single integrated unit;

said inner jaws 4, 38 comprise two heads located on opposite sides of the chuck structure axis, the narrower one of which is in the form of a connector means 4' either provided directly with a rack gear 3 or embedding a connector means 55 provided with a rack gear 3 and guided axially, whereas the wider one of said heads, which forms a counterweight on the opposite side, comprises a hole 10, the axis of which defines an acute angle with respect to the chuck structure axis;

respective heads of said inner jaws 4, 38 have equal dimensions between each other, wherein bridges 7, 8, 9 between the respective heads are translated axially relatively to each other;

said wedge-type mechanism connected to said central drawing head 12 is arranged in such a way the central drawing head 12 comprises three cylindrical studs 11 fixed therein, tie axis of which define an acute angle with respect to the chuck structure axis;

said studs 11 are connected into holes 10 bored into said counterweights 6;

bushings 14 are built into holes formed in the chuck body 1 against respective chuck jaws 2, wherein the axis of said holes are parallel to the chuck structure axis; and a stud segment 15 with an axis in parallel to the chuck structure axis is guided in said bushings 14, wherein said stud segment 15 and the respective cylindrical stud 11 constitute a single integrated unit, or said stud segment 15 is built together with the cylindrical stud 11.

2. A chuck comprising:

chuck jaws 2 guided in a chuck body 1;

inner jaws 67 connected to said chuck jaws 2, wherein the inner jaws 67 can be engaged and disengaged with said chuck jaws 2, and are connected through a wedge-type mechanism to a central drawing head 88 which, in turn, is connected to a piston of a hydraulic cylinder 28 assembled on the rearward side of a main spindle 25 via a rod or pipe guided through a central hole of said main spindle 25; wherein said inner jaws 67 comprise connector means 70 guided axially and radially and provided with a rack gear 3 and a double locking device;

each connector means 70 has two cylindrical surfaces with a common axis but different diameter, wherein the large cylindrical surface is guided in a hole 67' comprising a wide control element, wherein said hole 67' is bored into the face of said inner jaw 67, whereas the smaller cylindrical surface is guided in a hole 67" bored into the narrower, rearward side of said inner jaw 67, and counterweights 91 for compensation of the centrifugal force are connected, through arms 92, to grooves formed on the side wall of said inner jaw 67, wherein the longitudinal axis of said arms 92 extend in parallel to the axis of rotation of the main spindle 25.

3. The chuck as claimed in claim 1 wherein a first element of the double locking device is a control ring 41 turnably guided on the external surface of said chuck body 1 wherein said control ring 41 is provided with control elements in the form of control rollers 44 or control members 60, 61, 71, whereas a second element of the double locking device is a locking element accommodating between said control ring 41 and said chuck body 1.

4. The chuck as claimed in claim 3 wherein said locking means between said control ring 41 and said chuck body 1 is formed as a locking stud 47 guided axially in the control ring 41, which includes a rearward segment 48 arranged between locking surfaces 51 when the chuck body 1 and the control ring 41 are locked together, wherein the locking surfaces 51 are rigidly secured to the machine tool.

5. The chuck as claimed in claim 4 wherein said control ring 41 comprises a hole bored into its lateral surface, wherein a first stud 76 of a manually operated chuck wedge 75 can be inserted into said hole, and a second stud 77 of said chuck wedge 75 is connected to surface regions adapted for axial movement of said detent pin 47.

6. The chuck as claimed in claim 3 wherein the control ring 41 has segments 43 extending radially into cutoffs 42 of the chuck body 1, wherein the segments 43 are turnably inserted between the internal face of said cutoffs 42 of the chuck body 1 and the face of an adapter disk 49, and control rollers, control wedges or holding locks, which extend into a space between said adapter disk 49 and connector means 4', 55, 70 guided axially, are secured to said segments 43.

7. The chuck as claimed in claim 1 wherein a first element of the 16 comprises control surfaces and control members 19, 21, 71 formed on a control ring 18, 79 turnably guided on the internal surface of the chuck body 1, which are connected either indirectly, through interface elements or directly to connector means 4', 55, 70 guided axially;

a second element of the locking device is an actuating means assembled on the back side of the main spindle 25, wherein said locking means comprises a rotating star 27 connected to the control ring 18, 79 via a pipe 26 led through a hole of the main spindle 25, wherein shanks of said rotating star 27 are led out through an aperture of an inset 29 between the main, spindle 25 and the main hydraulic cylinder 28, wherein rollers 30 connected to sections 32 of a guide-way of a ring 31 in parallel to the chuck structure axis are fixed to said shanks wherein said sections 32 of said guide-ways are followed by helical guide-ways 32;

additional rollers 33 are assembled onto said inset 29, and are connected to guide-ways 34 of said ring 31, wherein longitudinal axis of said guide-ways 34 are parallel to the chuck structure axis;

a straddle fork 36 is connected to a groove of the ring 31 perpendicularly to the chuck structure axis; and a piston of an auxiliary hydraulic cylinder 37 is connected to said straddle fork 36.

8. The chuck as claimed in claim 3 wherein the inner jaws 4 have radial control elements 56, 57, 58 which are connected to the internal face of the chuck body 1.

9. The chuck as claimed in claim 1 wherein the central drawing head 12 guided in the hole of the main spindle 25 and the cylindrical studs 11 of the wedge-type mechanism 11, 15 are connected to each other through circular segments 59.

10. The chuck as claimed in claim 2 wherein a single central drawing pipe 83 is built in the hole of the main spindle 25, wherein surface regions 82 for transmission of torque are formed, on both front and back sides, on the external surface of said central drawing pipe 83, wherein said surface regions 82 are connected to torque-transmitting surfaces of both the control ring 79 guided in the chuck body 1 and the rearward rotating star 27; and flanges 85, 86 are formed on the front and back face of said central drawing pipe 83 which are turnably connected to a wedge type central drawing head 88 and to a piston-rod 87 of the rearward main hydraulic cylinder 28.

11. The chuck as claimed in claim 10 wherein the second element of the locking device is an arm 96 connected through a hinge 95 to the rotating star 27 on the rearward side, of the main spindle, wherein the rotating star 27 is prevented from turning relatively with respect to the central drawing pipe 83, and surface regions of said arm 96 are connected to the main spindle 25 at a first switching position, whereas said surface regions are connected to non-moving grooves/surface regions 102 at a second switching position.

12. The chuck as claimed in claim 10 wherein surface regions 89 extending from the face of the control ring 79 are connected to cutoffs 90 of the central drawing head 88 at normal operation of the chuck, whereas at the two turned positions of the control ring 79, i.e. at jaw adjustment operation, said surface regions butt on the face of the central drawing head 88 when the central drawing head 88 is pulled back.

13. The chuck as claimed in claim 1 wherein motion of the central drawing head 12, 65, 88 with a maximum stroke is performed by moving the inner jaw 4, 38, 67 by two tooth pitches.

14. The chuck as claimed in claim 10, wherein said surface regions 82 comprise polygonal surfaces.

15. The chuck as claimed in claim 12, wherein said surface regions 89 comprise surfaces of detent pins.

* * * * *